United States Patent
O'Sullivan et al.

(10) Patent No.: US 11,928,421 B2
(45) Date of Patent: Mar. 12, 2024

(54) TECHNICAL DOCUMENT ERROR DETECTION

(71) Applicant: DePuy Ireland Unlimited Company, Ringaskiddy (IE)

(72) Inventors: Timothy O'Sullivan, Bantry (IE); Shane Dempsey, Silversprings (IE)

(73) Assignee: DePuy Ireland Unlimited Company (IE)

( * ) Notice: Subject to any disclaimer, the term of this patent is extended or adjusted under 35 U.S.C. 154(b) by 0 days.

(21) Appl. No.: 17/935,623

(22) Filed: Sep. 27, 2022

(65) Prior Publication Data
US 2023/0096955 A1    Mar. 30, 2023

Related U.S. Application Data

(60) Provisional application No. 63/250,320, filed on Sep. 30, 2021.

(51) Int. Cl.
*G06F 17/00*    (2019.01)
*G06F 16/38*    (2019.01)
(Continued)

(52) U.S. Cl.
CPC .......... *G06F 40/169* (2020.01); *G06F 16/382* (2019.01); *G06F 40/103* (2020.01)

(58) Field of Classification Search
CPC ..... G06F 40/169; G06F 16/382; G06F 40/103
(Continued)

(56) References Cited

U.S. PATENT DOCUMENTS 6,256,631 B1   7/2001  Malcolm
7,003,719 B1   2/2006  Rosenoff et al.
(Continued)

FOREIGN PATENT DOCUMENTS

AU     2740200 A     8/2000
AU     2015211152 A1   8/2016
(Continued)

OTHER PUBLICATIONS

Wikipedia—List of Unicode Characters, https://en.wikipedia.org/wiki/List_of_Unicode_characters, web-archive capture from Aug. 12, 2021, accessed on Aug. 15, 2023 from https://web.archive.org/web/20210812012529/https://en.wikipedia.org/wiki/List_of_Unicode_characters, 43 pages.

*Primary Examiner* — Stephen S Hong
*Assistant Examiner* — Matthew J Ludwig
(74) *Attorney, Agent, or Firm* — BakerHostetler

(57) ABSTRACT

A computing system may identify a first reference citation within a technical document, wherein the first reference citation is identified based at least in part a length of a first block of text that is included in the first reference citation and an inclusion of at least one numeric character in the first block of text. The computing system may determine, based on querying at least one datastore, whether the first reference citation matches a matching stored reference citation. The computing system may determine, based at least in part on whether the first reference citation matches the matching stored reference citation, an error review prioritization status for the first reference citation. The error review prioritization status may also be determined based, in part, on a specified revision number for the first reference citation. The computing system may provide visual feedback indicating the error review prioritization status.

20 Claims, 11 Drawing Sheets

(51) Int. Cl.
*G06F 40/103* (2020.01)
*G06F 40/169* (2020.01)

(58) Field of Classification Search
USPC .......................................................... 715/230
See application file for complete search history.

(56) References Cited

U.S. PATENT DOCUMENTS

| | | | |
|---|---|---|---|
| 7,028,259 B1 * | 4/2006 | Jacobson | G06F 40/253 |
| | | | 715/236 |
| 7,120,642 B2 | 10/2006 | Hsu et al. | |
| 8,001,457 B2 | 8/2011 | Rosenoff et al. | |
| 8,082,241 B1 | 12/2011 | Pop-Lazarov et al. | |
| 8,201,085 B2 | 6/2012 | Rollins et al. | |
| 8,381,095 B1 * | 2/2013 | Fischer | G06F 40/177 |
| | | | 715/239 |
| 8,566,304 B2 | 10/2013 | Pop-Lazarov et al. | |
| 8,676,780 B2 | 3/2014 | Rollins et al. | |
| 9,176,938 B1 * | 11/2015 | Kerschen | G06F 16/93 |
| 9,177,013 B2 | 11/2015 | Rollins et al. | |
| 9,244,680 B2 * | 1/2016 | Phelan | G06F 8/73 |
| 9,678,949 B2 | 6/2017 | Monk, II et al. | |
| 9,990,340 B2 | 6/2018 | Kutilek et al. | |
| 10,002,116 B2 | 6/2018 | Pop-Lazarov et al. | |
| 10,474,995 B2 * | 11/2019 | Marsh | G06Q 10/10 |
| 10,789,418 B2 | 9/2020 | Kutilek et al. | |
| 10,838,943 B2 * | 11/2020 | Banatwala | G06F 16/958 |
| 10,891,320 B1 * | 1/2021 | Tseng | G06F 3/0485 |
| 11,308,112 B2 * | 4/2022 | Mossman | G06F 9/44526 |
| 2005/0149851 A1 | 7/2005 | Mittal | |
| 2008/0077417 A1 * | 3/2008 | Lazzarino | G06Q 10/00 |
| | | | 705/301 |
| 2008/0256435 A1 | 10/2008 | Gottlieb et al. | |
| 2008/0320579 A1 * | 12/2008 | Rollins | G06F 40/166 |
| | | | 726/10 |
| 2009/0187567 A1 | 7/2009 | Rolle | |
| 2011/0282890 A1 * | 11/2011 | Griffith | G06F 16/24573 |
| | | | 707/758 |
| 2011/0314402 A1 * | 12/2011 | Kikin-Gil | G06Q 10/109 |
| | | | 715/772 |
| 2013/0071020 A1 | 3/2013 | Tsibulevskiy et al. | |
| 2014/0006424 A1 * | 1/2014 | Al-Kofahi | G06F 16/00 |
| | | | 707/754 |
| 2019/0325021 A1 | 10/2019 | Zhang | |

FOREIGN PATENT DOCUMENTS

| | | |
|---|---|---|
| CA | 2361021 A1 | 7/2000 |
| CA | 2699637 A1 | 7/2000 |
| CA | 2551840 A1 | 7/2005 |
| CA | 2945684 A1 | 8/2015 |
| CN | 101952802 A | 1/2011 |
| CN | 108572942 A | 9/2018 |
| EP | 1161733 A2 | 12/2001 |
| EP | 1700232 A1 | 9/2006 |
| EP | 2583204 A2 | 4/2013 |
| EP | 3103002 A1 | 12/2016 |
| GB | 2329988 A | 4/1999 |
| JP | 2002-535779 A | 10/2002 |
| JP | 2013-528885 A | 7/2013 |
| JP | 2013-229046 A | 11/2013 |
| JP | 5616491 B2 | 10/2014 |
| JP | 5992404 B2 | 9/2016 |
| JP | 2017-505970 A | 2/2017 |
| JP | 6735679 B2 | 8/2020 |
| NZ | 513147 A | 2/2004 |
| NZ | 529689 A | 6/2008 |
| WO | 2000/043918 A2 | 7/2000 |
| WO | 2005/066834 A1 | 7/2005 |
| WO | 2009/002470 A2 | 12/2008 |
| WO | 2011/159843 A2 | 12/2011 |
| WO | 2014/093935 A1 | 6/2014 |
| WO | 2015/116604 A1 | 8/2015 |
| WO | 2019/049088 A1 | 3/2019 |

* cited by examiner

Technical Document Review Tool Interface 110

The purpose of this technical document is to establish that the DEV99999 is operating correctly. This technical document also establishes that DEV99999 is producing parts in accordance with 11111111 Rev 1 as described herein. Some example uses for these parts are described in the 222222222 Rev 1 document.

The parts should be labeled as described in the 333333333 Rev 2 labeling specification document. The text of 333333333 Rev 22 describes sizes and locations for the labels. The 111111112 Rev 2 manufacturing specification describes how the parts are made prior to labeling.

Technical Document 111

Fig. 2A

Error Review Prioritization Statuses 200 (Examples)

First Priority Review Status 201
(e.g., may be indicated by red highlighting, dashed lines, etc.)

- Identified reference citation doesn't match any stored reference citation

- Identified reference citation matches a stored reference citation, but specified version isn't currently approved/released

- Identified reference citation matches a stored reference citation, no revision specified, and no revision is currently approved/released

- Multiple different revisions of identified reference citation are specified in the technical document Second Priority Review Status 202
(e.g., may be indicated by green highlighting, solid lines, etc.)

- Identified Reference citation matches a stored reference citation - and, if identified reference citation is a document, specified revision (if any) is currently approved or released

Fig. 2B

Technical Document Review Tool Interface 110

Reference Summary Table 500

| Reference Type Column 501 | Reference Column 502 | Description Column 503 | Count Column 504 |
|---|---|---|---|
| Asset | DEV99999 | Manufacturing Device | 2 |
| Document | 111111111 | Manufacturing Specification | 1 |
| Document | 222222222 | Usage Specification | 1 |
| Document | 333333333 | Labeling Specification<br>Warning: multiple revisions detected in document | 2 |
| Likely Error | 111111112 | Unknown 9 digit number (possible typo) | 1 |

Fig. 5

Technical Document Review Tool Interface 110

Reference List Table 600

| Reference Type Column 601 | Tag Column 602 | Surrounding Text Column 603 | Status Column 604 | Description Column 605 |
|---|---|---|---|---|
| Asset | TAG-301 | 311 — "the DEV99999 is operating" | | Manufacturing Device |
| Asset | TAG-302 | 312 — "that DEV99999 is producing" | | Manufacturing Device |
| Document | TAG-303 | 313 — "with 11111111 Rev 1 as" | Rev 1 released | Manufacturing Specification |
| Document | TAG-304 | 314 — "the 22222222 Rev 1 document." | Detected Revision Mismatch Rev 1 revised Rev 2 released | Usage Specification |
| Document | TAG-305 | 315 — "the 33333333 Rev 2 labeling" | Detected Revision Mismatch Rev 2 revised Rev 3 released | Labeling Specification |
| Invalid Revision | TAG-306 | 316 — "of 33333333 Rev 22 describes" | Detected Revision Mismatch Rev 22 not found Rev 3 released | Labeling Specification |
| Likely Error | TAG-307 | 317 — "The 111111112 Rev 1 manufacturing" | Unknown 9 digit number (possible typo) | Unknown 9 digit number (possible typo) |

Fig. 6

Technical Document Review Tool Interface 110

Warning and Error Table 700

| Reference Type Column 701 | Tag Column 702 | Surrounding Text Column 703 | Status Column 704 | Description Column 705 |
|---|---|---|---|---|
| Document | TAG-304 | "the 222222222 Rev 1 document." (314) | Detected Revision Mismatch Rev 1 revised Rev 2 released | Usage Specification |
| Document | TAG-305 | "the 333333333 Rev 2 labeling" (315) | Detected Revision Mismatch Rev 2 revised Rev 3 released | Labeling Specification |
| Invalid Revision | TAG-306 | "of 333333333 Rev 22 describes" (316) | Detected Revision Mismatch Rev 22 not found Rev 3 released | Labeling Specification |
| Likely Error | TAG-307 | "The 111111112 Rev 1 manufacturing" (317) | Unknown 9 digit number (possible typo) | Unknown 9 digit number (possible typo) |

Fig. 7

TECHNICAL DOCUMENT ERROR DETECTION

CROSS REFERENCE TO RELATED APPLICATIONS

This application claims benefit under 35 U.S.C. § 119(e) of Provisional U.S. Patent Application No. 63/250,320, filed Sep. 30, 2021, the contents of which are hereby incorporated by reference in their entirety.

TECHNICAL FIELD

The present disclosure relates generally to computer-implemented techniques for detection of potential errors (e.g., reference citation errors) and prioritization of review tasks in a technical document, such as a technical document related to a medical device or other technical product.

BACKGROUND

Technical document generation and approval is an essential step in many engineering and product management projects. The creation and approval of technical documents may be a time-consuming and expensive process. Currently, technical documents may be reviewed by human reviewers. With manual review, there is a high risk of mistakes. The cost of technical document errors is very high. For example, technical document errors may delay a product launch, cause negative regulatory and patient-related impacts, and other problematic results. Technical documents may often require multiple weeks to proceed through the approval process, and a rejection at any point in time may result in the technical document returning to the draft state and beginning the approval process all over again.

An important feature of the technical document review process includes review of reference citations. Cited references in a technical document may include references to procedures, test methods, drawings, physical assets, and the like. Some technical documents can be hundreds of pages long with more than one-thousand references, thereby making the human review very slow and mistake-prone. In many cases, cited reference errors may be particularly difficult for human reviewers to detect. Cited documents may typically have an associated revision number. In some cases, when a document is cited with a revision number that is not currently approved or released, then this may constitute a citation error. In many cases, cited reference errors must be corrected. Thus, when a reference error is detected, the technical document may be required to be rejected. Even a single minor error, such as transposing of two digits in a cited reference, may trigger rejection of the technical document.

SUMMARY

A computer-implemented method is described that may include identifying, by a computing system, a first reference citation within a technical document, wherein the first reference citation is identified based at least in part a length of a first block of text that is included in the first reference citation and an inclusion of at least one numeric character in the first block of text. The computer-implemented method may also include determining, by the computing system, based on querying at least one datastore, whether the first reference citation matches a matching stored reference citation included in a plurality of stored reference citations. The computer-implemented method may also include determining, by the computing system, based at least in part on whether the first reference citation matches the matching stored reference citation, an error review prioritization status for the first reference citation. The computer-implemented method may also include providing, by the computing system, visual feedback indicating the error review prioritization status.

The first reference citation may be identified, based at least in part, on the first block of text including at least a specified minimum number of characters, such as at least three characters. The computer-implemented method may also include determining whether a revision number for the first reference citation is specified in the technical document. The revision number may be determined to be specified based at last in part on the first reference citation being immediately followed by a word boundary that is immediately followed by the English word Revision or an English abbreviation thereof or a corresponding non-English language word or non-English language abbreviation.

The error review prioritization status may be either a second-priority review status or a first-priority review status. The second-priority review status may correspond to a successful matching of the first reference citation to the matching stored reference citation and no revision error. The first-priority review status may correspond to a failure to match the first reference citation to the matching stored reference citation. The first-priority review status may also correspond to a successful matching of the first reference citation to the matching stored reference citation and a revision error (e.g., the specified revision isn't currently approved or released, no revision is currently approved or released, multiple different revision numbers for the first reference citation are specified in the technical document).

The visual feedback may include a visual modification to the technical document. The visual feedback may have a color coding that indicates the error review prioritization status of the first reference citation. The visual feedback may be at least partially included in a reference information table. The reference information table may include a clickable link to a location, within the technical document, of the first reference citation.

The computer-implemented method may also include transforming the first reference citation to a hyperlink that links to a record of the matching stored reference citation. The computer-implemented method may also include obtaining, from the at least one datastore, metadata for the matching stored reference citation. The computer-implemented method may also include displaying the metadata for the matching stored reference citation. The at least one datastore may include at least one of an asset datastore or a document datastore.

A computing system is also described that includes one or more processors and one or more memories. The one or more memories have stored instructions that, upon execution by the one or more processors, cause the computing system to perform operations. The operations may include identifying a first reference citation within a technical document, wherein the first reference citation is identified based at least in part a length of a first block of text that is included in the first reference citation and an inclusion of at least one numeric character in the first block of text. The operations may also include determining, based on querying at least one datastore, whether the first reference citation matches a matching stored reference citation included in a plurality of stored reference citations. The operations may also include determining, based at least in part on whether the first reference citation matches the matching stored reference citation, an error review prioritization status for the first reference citation. The operations may also include providing visual feedback indicating the error review prioritization status.

The first reference citation may be identified, based at least in part, on the first block of text including at least a specified minimum number of characters, such as at least three characters. The operations may also include determining whether a revision number for the first reference citation is specified in the technical document. The revision number may be determined to be specified when the first reference citation is immediately followed by a first single space that is immediately followed by text Revision or Rev or R immediately followed by a second single space immediately followed by a second block of text having a minimum length of one character and a maximum length of five characters.

BRIEF DESCRIPTION OF THE DRAWINGS

For a more complete understanding of the principles disclosed herein, and the advantages thereof, reference is now made to the following descriptions taken in conjunction with the accompanying drawings, in which:

FIG. 2A is a diagram of an example technical document displayed in an interface of a technical document review tool;

FIG. 2B is a diagram of example error review prioritization statuses;

FIG. 5 is a diagram of an example reference summary table;

FIG. 6 is a diagram of an example reference list table;

FIG. 7 is a diagram of an example warning and error table;

DETAILED DESCRIPTION

Figure 1:
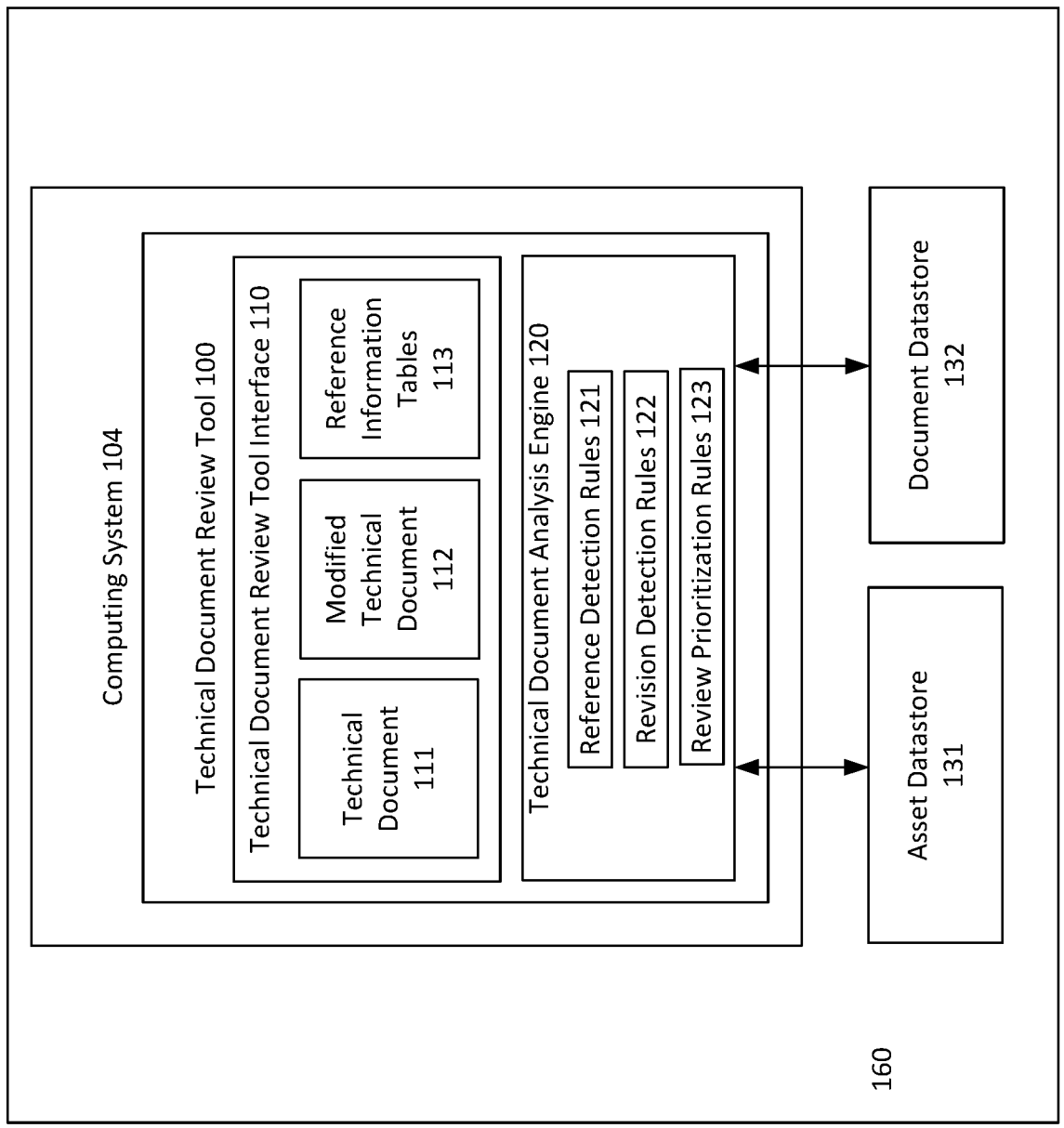
FIG. 1 is a diagram of an example technical document review system.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims. Further, the term "at least one" stated structure as used herein can refer to either or both of a single one of the stated structure and a plurality of the stated structure. Additionally, reference herein to a singular "a," "an," or "the" applies with equal force and effect to a plurality unless otherwise indicated. Similarly, reference to a plurality herein applies with equal force and effect to the singular "a," "an," or "the."

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Referring now to FIG. 1, an example technical document review system will now be described in detail. As shown in FIG. 1, technical document review system 160 includes a technical document review tool 100 that is executed by a computing system 104. The technical document review tool 100 includes a technical document review tool interface 110 and a technical document analysis engine 120. The technical document review tool interface 110 is a user interface. The technical document review tool interface 110 may be presented via one or more graphical user interfaces (GUI's), which may be included in computing system 104. In some examples, the technical document review tool interface 110 may be provided on one or more client computing devices, while the technical document analysis engine 120 may be executed on one or more server computing devices, such as cloud computing components or other remote or local server components. In other examples, the technical document analysis engine 120 may be distributed between client and server computing devices or may be entirely client-based.

A user of the technical document review tool 100 may select, via technical document review tool interface 110, a technical document 111 for review by the technical document review tool 100. The review of technical document 111 may be performed in connection with a document approval process, which the technical document 111 may be required to successfully complete in order to be approved and, eventually, released, such as for distribution to a product floor, etc. In order to be reviewed by the technical document review tool 100, the technical document 111 may be stored in computing memory accessible to the technical document review tool 100.

In some examples, technical document review tool 111 may review technical document 111 for only certain types of errors, such as reference citation errors. Other automated tools and/or human review may optionally be employed for proofreading of other types of errors, such as spelling errors, grammar errors, etc. Additionally, in some examples, technical document review tool 111 may not correct any detected errors. Rather, technical document review tool 111 may instead provide indications of likely errors to the user (e.g., by assigning a first-priority review status). The user may then review the error candidates to confirm that changes should be made. Moreover, the technical document review tool 111 may also provide indications to users of citations that are determined by the technical document review tool 111 as not likely to include errors (e.g., by assigning a second-priority review status). In this manner, the technical document review tool may be used as aide to assist users, without overriding human input or making unconfirmed changes to the technical document 111.

Referring now to FIG. 2A, some example contents of technical document 111 will now be described. As shown in FIG. 2A, technical document 111 is shown in technical document review tool interface 110. In this example, there are seven reference citations included in the technical document 111 that is displayed in FIG. 2A. Specifically, the first (i.e., top) displayed text line of technical document 111 includes a citation to DEV99999. The second displayed text line includes citations to DEV99999 and 111111111 (with associated Rev 1). The third displayed text line includes a citation to 222222222 (with associated Rev 1). The fourth displayed text line includes a citation to 333333333 (with associated Rev 2). The fifth displayed text line includes citations to 333333333 (with associated Rev 22) and 111111112 (with associated Rev 1). As should be appreciated, the text and reference citations shown in FIG. 2A are merely non-limiting examples. It is noted that, for ease of illustration and explanation, technical document 111 of FIG. 2A includes only six lines of text and seven reference citations. It is noted, however, that many technical documents may span several pages of text and may have large quantities of reference citations. In some examples, technical document review tool interface 110 may allow users to scroll up and down through multiple different pages of these larger technical documents.

Upon selection of technical document 111, technical document analysis engine 120 may read the technical document 111, for example reading text from headers, footers, pages, tables, and/or other fields of the technical document 111. The technical document analysis engine 120 may then apply a reference detection rules 121 to detect reference citations within the technical document 111. In some examples, reference citations may be detected based at least in part on factors including: a length of a block of text in the document, the block of text including at least one numeric character, and optionally other factors. In one specific example, reference detection rules 121 may specify that a reference is detected when a block of text is identified that is at least a specified minimum number of characters long (e.g., at least three characters long) and that has at least one numeric character. The term block of text, as used herein, refers to text having a start and an end that correspond to boundaries (e.g., spaces, tabs, new line returns, start of a string, end of a string, etc.). Thus, for example, a block of text may be text between two spaces, such as a word. Accordingly, when a reference citation is limited to a block of text, the reference citation cannot include a space. The reference citation may, however, include letters, numbers, and/or symbols.

In other examples, the reference detection rules 121 may not require that a reference citation include at least one number. In these cases, other techniques may be employed to detect a reference citation. For example, each detected block of text in the technical document 111 could be compared to words in an English (or other appropriate language) dictionary database. Each compared block of text that does not match to a stored word within the dictionary database may then be assumed to be a reference citation.

For each detected reference citation, the technical document analysis engine 120 may apply revision detection rules 122 to determine whether a reference number for the reference citation is specified in the technical document 111. In one specific example, the revision detection rules 122 may indicate that a revision number is detected based at last in part on the first reference citation being immediately followed by a word boundary that is immediately followed by the English word Revision or an English abbreviation thereof (e.g., Rev, R, etc.) or a corresponding non-English language word or non-English language abbreviation. A word boundary is a non-character boundary, such as one or more spaces, tabs and/or a new line. Additionally, in some examples, the revision detection rules 122 may indicate that a revision number is detected when the word Revision (or abbreviation or corresponding non-English word/abbreviation) is followed (i.e., immediately followed or separated by a word boundary) by a string of text having a minimum length of one character and a specified maximum length of characters (e.g., five characters).

Moreover, in some examples, a reference citation and its corresponding revision number may be in different cells of a table within the technical document 111. This type of layout may be common in validation documents. A revision number may often appear, within a table, in a column that is immediately to the right of the column that includes the reference citation to which the revision number corresponds. Thus, revision detection rules 122 may further specify that, when a reference citation is detected in a cell of a table, a corresponding revision number may be detected if a revision number is identified, in the same row of the table, in a cell in the column immediately to the right of the column that includes the reference citation. The cell containing the revision number must be on the same row and immediately to the right of the cell containing the reference citation. The revision detection rules 122 may further require that two additional conditions must be met in order for the corresponding revision number to be detected. Specifically, a first condition may require that the cell that includes the reference citation must have only one reference citation. This is because, if multiple reference citations are detected, it may be impossible to determine which reference a revision belongs to. Additionally, a second condition may require that the cell that includes the revision number must have only one revision number. This is because, if multiple revision numbers are detected, it may be impossible to determine which revision number a reference citation belongs to. It is noted that the revision number may be identified in the cell using similar rules as described above (e.g., the English word Revision or an English abbreviation thereof (e.g., Rev, R, etc.) or a corresponding non-English language word or non-English language abbreviation that is followed (i.e., immediately followed or separated by a word boundary) by a string of text having a minimum length of one character and a specified maximum length of characters (e.g., five characters).

In some examples, references that are cited within technical documents are technical references that may be grouped into two categories, which are documents and assets. Some example documents may include procedures, test methods, drawings, and the like. Assets may include, for example, physical assets, such as products. In some examples, companies and organizations may store information regarding documents and assets in separate datastores. For example, referring back to FIG. 1, information about assets may be stored in asset datastore 131, while information about documents may be stored in document datastore 132. A datastore, as that term as used herein, refers to one or more searchable information collections, such as a database.

Additionally, in some examples, each revision of a technical document may have an associated stage. The stages of a technical document may include, a create stage, a review stage, an approved stage, a released stage, and a revised stage. In the create stage, a document may be created and edited. The document cannot be edited in any stage except the create stage. In the review stage, the document is reviewed for errors. When errors are detected in the review stage, the technical document may be rejected and returned to the create stage. In the approved stage, the document is approved but is not yet released. Some revisions may be held in the approved state for several weeks, for example so that key individuals can be trained to the new revision before it is released. In the released state, a document is released those that need the document. For example, a released manufacturing procedure may be printed and distributed to the product floor. Notably, only a single revision of a document may be in the released state at any given time. A revision will transfer to the revised state when a subsequent revision of the document is released. A revision in the revised state should no longer be used or referenced. Thus, citations to revisions that are not released or approved may be considered, by the technical document review tool 100, to be errors. Additionally, in some examples, a document may be transferred to an obsolete state, meaning that the entire document is obsolete and no revision should be used or referenced. In some examples, the techniques described herein may allow early detection of errors, such as when in the create stage, thereby saving time and reducing costs. For example, by employing the techniques described herein to detect errors in the create stage (in which the technical document can still be edited), these errors may be detected and corrected prior to the review stage (in which the technical document cannot be edited).

As will be described in detail below, for each reference citation that is identified within the technical document 111, the technical document analysis engine 120 may determine an error review prioritization status for the reference citation. As part of making this determination, the technical document analysis engine 120 may query sources of truth, such as the asset datastore 131 and/or the document datastore 132, to determine whether the identified reference citation matches any stored reference citation. In some examples, when the identified reference citation does not match any stored reference citation, then this may be an indication of a potential error. Additionally, if a revision number is specified for the reference citation, the technical document analysis engine 120 may also query the document datastore 120 to determine whether the specified revision is currently approved or released. When the specified revision is not currently approved or released, then this may be an indication of a definite error.

Referring now to FIG. 2B, some examples of error review prioritization statuses that may be determined by the technical document analysis engine 120 will now be described in detail. In the example of FIG. 2B, error review prioritization statuses 200 include a second-priority review status 202 and a first-priority review status 201. As indicated in FIG. 2B, the second-priority review status 202 may be assigned to an identified reference citation in cases when the identified reference citation matches a stored reference citation—and, if the identified reference citation is a document, a specified revision (if any) is approved or released. In these scenarios, the likelihood of the identified reference citation being incorrect is low. The second-priority review status 202 does not mean that there cannot possibly be an error associated with the identified citation. Rather, it means that the technical document analysis engine 120 has determined that the likelihood of such an error is low. Because the likelihood of there being an error is low, human review of the reference citation is not a high priority. In some examples, the technical document review tool 100 may indicate the second-priority review status 202 using visual features such as green highlighting, solid lines, and the like. In particular, the use of the color green is commonly associated with an indication that it is safe to proceed, such as when used in green traffic lights. It is noted that, even when the second-priority review status 202 is assigned to a citation, it is still good practice for the citation to be reviewed by a human reviewer. In some cases, a typo could cause the citation to improperly refer to an unintended reference that just happens to be released. A human review may help to detect these and other errors. It is noted that the names of the stages described above may vary between different systems, and there is no requirement that the stages must be referred to using the exact names and/or terminology that is used herein.

First-priority review status 201 may indicate that the likelihood of an error associated with an identified reference citation is higher than second-priority review status 202. Thus, it may be desirable for reference citations having the first-priority review status 201 to receive more user attention than reference citations having the second-priority review status 202 (i.e., because they may be more likely to be incorrect). Accordingly, in some examples, the technical document review tool 100 may indicate the first-priority review status 201 using visual features such as red highlighting, dashed lines, and the like. In particular, the use of the color red is commonly associated with an indication of danger, such as when used in red traffic lights.

As shown in FIG. 2B, there are a number of scenarios when the first-priority review status 201 may be assigned to an identified reference citation. Specifically, the first-priority review status 201 may be assigned in cases when the identified reference citation doesn't match any stored reference citation (e.g., doesn't match any stored reference citation in asset datastore 131 or document datastore 132). The first-priority review status 201 may also be assigned in cases when the identified reference citation matches a stored reference citation, but the specified revision isn't currently approved or released. The first-priority review status 201 may also be assigned in cases when an identified reference citation matches a stored reference citation, no revision is specified, and no revision is currently approved or released. The first-priority review status 201 may also be assigned in cases when there are multiple different revisions of an identified reference citation that are specified in the technical document 111. When multiple different revisions of an identified reference citation that are specified in the technical document 111, this is an indication that at least one of the identified revisions is likely to be an error.

Review prioritization rules 123 of FIG. 1 are rules that may be employed by the technical document analysis engine 120 to assign one of the document review prioritization statuses 200 to a given reference citation. For example, the review prioritization rules 123 may indicate that second-priority review status 202 may be assigned to an identified reference citation in cases when the identified reference citation matches a stored reference citation—and, if the identified reference citation is a document, a specified revision (if any) is approved or released. The review prioritization rules 123 may also indicate that first-priority review status 201 may be assigned to an identified reference citation in cases when the identified reference citation doesn't match any stored reference citation, when the identified reference citation matches a stored reference citation, but the specified revision isn't currently approved or released, when an identified reference citation matches a stored reference citation, no revision is specified, and no revision is currently approved or released, or when there are multiple different revisions of an identified reference citation that are specified in the technical document 111.

It is noted that FIG. 2B displays only one specific example of error review prioritization statuses 200 and that other additional and alternative statuses may also be employed in accordance with the techniques described herein. For example, in an alternative embodiment, error review prioritization statuses 200 may include second-priority review status 202, first-priority review status 201, and a third status, such as a potential error status. The potential error status could be indicated using yellow or amber highlighting. In this alternative embodiment, the potential error status may include potential errors such as when multiple different revisions of an identified reference citation are specified in the technical document 111, when a cited revision is in the review stage (but is not yet approved or released), and the like.

Upon determining the error review prioritization statuses 200 of reference citations in the technical document 111, the technical document review tool 100 may provide visual indications of the error review prioritization statuses 200. In some examples, the indications of the error review prioritization statuses 200 may be displayed in a modified technical document 112. The modified technical document 112 is a copy of the technical document 111 that is modified to include modifications generated by the technical document review tool 100. It is noted that the actual underlying technical document 111 itself is not modified to include these modifications. The modified technical document 112 may include all of the contents of the technical document 111 (e.g., all of the text of technical document 111). In addition to the contents of the technical document 111, the modified technical document 112 may also include the modifications generated by the technical document review tool 100. These modifications may include visual aides that indicate the error review prioritization statuses 200 of reference citations in the technical document 111. In some examples, these visual aides may be color-coded. For example, in some cases, reference citations having the second-priority review status 202 could be highlighted using a first color (e.g., green), and reference citations having the first-priority review status 201 could be highlighted using a second color (e.g., red). In other examples, reference citations having the second-priority review status 202 could be displayed inside solid-lined boxes, and reference citations having the first-priority review status 201 could be displayed inside dashed-lined boxes.

Figure 3:
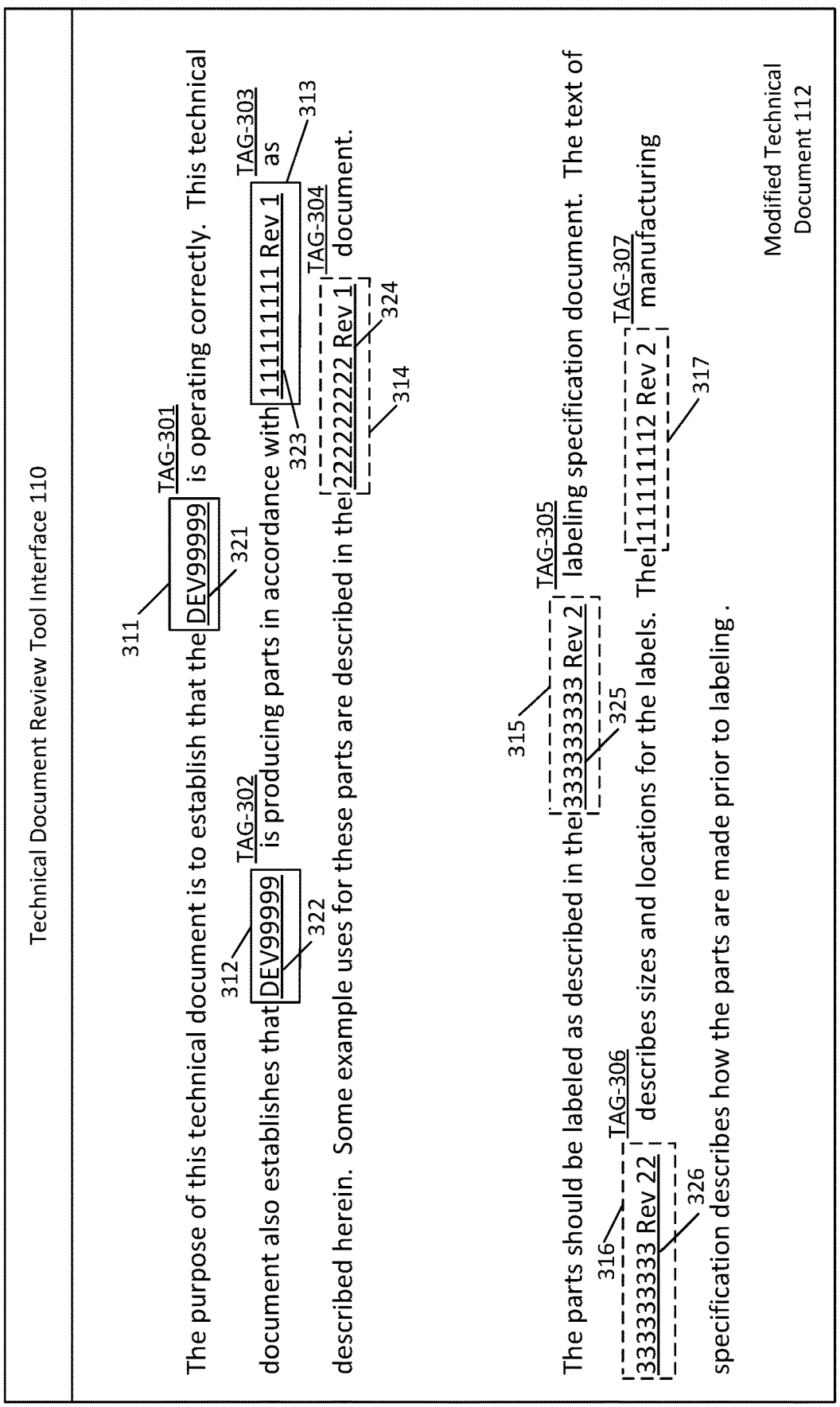
FIG. 3 is a diagram of an example modified technical document displayed in an interface of a technical document review tool.

Referring now to FIG. 3, some example visual indications of error review prioritization statuses 200 will now be described in detail. In the example of FIG. 3, reference citations having the second-priority review status 202 are displayed inside solid-lined boxes, and reference citations having the first-priority review status 201 are be displayed inside dashed-lined boxes. As shown in FIG. 3, the first DEV99999 reference citation on the first (i.e., top) line of modified technical document 112 is determined to have second-priority review status 202. Accordingly, a solid-lined box 311 is displayed surrounding the first DEV99999 reference citation. Also, the second DEV99999 reference citation on the second line of modified technical document 112 is determined to have second-priority review status 202. Accordingly, a solid-lined box 312 is displayed surrounding the second DEV99999 reference citation. Also, the 111111111 (with associated Rev 1) reference citation on the second line of modified technical document 112 is determined to have second-priority review status 202. Accordingly, a solid-lined box 313 is displayed surrounding the 111111111 (with associated Rev 1) reference citation.

By contrast, the 222222222 (with associated Rev 1) reference citation on the third line of modified technical document 112 is determined to have first-priority review status 201. Accordingly, a dashed-lined box 314 is displayed surrounding the 222222222 (with associated Rev 2) reference citation. Also, the 333333333 (with associated Rev 2) reference citation on the third line of modified technical document 112 is determined to have first-priority review status 201. Accordingly, a dashed-lined box 315 is displayed surrounding the 333333333 (with associated Rev 2) reference citation. Also, the 333333333 (with associated Rev 22) reference citation on the fifth line of modified technical document 112 is determined to have first-priority review status 201. Accordingly, a dashed-lined box 316 is displayed surrounding the 333333333 (with associated Rev 22) reference citation. Also, the 111111111 (with associated Rev 2) reference citation on the fifth line of modified technical document 112 is determined to have first-priority review status 201. Accordingly, a dashed-lined box 317 is displayed surrounding the 111111111 (with associated Rev 2) reference citation.

In some examples, when a given reference citation in technical document 111 matches a stored reference citation from a source of truth (e.g., asset datastore 131 or document datastore 132), the technical document review tool 100 may transform the given reference citation into a hyperlink that that links to a record of the matching stored reference citation, such as a record in asset datastore 131 or document datastore 132. This may allow a user to quickly and easily navigate to the linked record and confirm whether the reference citation is correct. The hyperlinks may be displayed in the modified technical document 112. It is noted that, for references to documents, the revision number of the document may not be considered when determining whether a given reference citation matches a stored reference citation. Rather, it is only necessary for the reference citation itself to match. For example, for 333333333 Rev 22, the actual reference citation is to 333333333. The number 22 is merely a revision number that is associated with the 333333333 reference citation. Thus, the reference citation may be considered to match a stored reference citation as long as there is a stored reference to 333333333 in the document datastore 132. It is not required that Rev 22 must be a correct revision number in order for there to be a match to a stored reference citation.

In the example of FIG. 3, the first DEV99999 reference citation on the first (i.e., top) line of modified technical document 112 is determined to match to a stored reference citation in asset datastore 131. Accordingly, the first DEV99999 reference citation is transformed to a hyperlink 321 that links to the record for stored reference citation in asset datastore 131. Also, the second DEV99999 reference citation on the second line of modified technical document 112 is determined to match to a stored reference citation in asset datastore 131. Accordingly, the second DEV99999 reference citation is transformed to a hyperlink 322 that links to the record for stored reference citation in asset datastore 131. Also, the 111111111 (with associated Rev 1) reference citation on the second line of modified technical document 112 is determined to match to a stored reference citation in document datastore 132. Accordingly, the 111111111 (with associated Rev 1) reference citation is transformed to a hyperlink 323 that links to the record for stored reference citation in document datastore 132. Also, the 222222222 (with associated Rev 1) reference citation on the third line of modified technical document 112 is determined to match to a stored reference citation in document datastore 132. Accordingly, the 222222222 (with associated Rev 1) reference citation is transformed to a hyperlink 324 that links to the record for stored reference citation in document datastore 132. Also, the 333333333 (with associated Rev 2) reference citation on the fourth line of modified technical document 112 is determined to match to a stored reference citation in document datastore 132. Accordingly, the 333333333 (with associated Rev 2) reference citation is transformed to a hyperlink 325 that links to the record for stored reference citation in document datastore 132. Also, the 333333333 (with associated Rev 22) reference citation on the fifth line of modified technical document 112 is determined to match to a stored reference citation in document datastore 132. Accordingly, the 333333333 (with associated Rev 22) reference citation is transformed to a hyperlink 326 that links to the record for stored reference citation in document datastore 132. By contrast, the 111111112 (with associated Rev 2) reference citation on the fifth line of modified technical document 112 is determined to not match to any stored reference citation in asset datastore 131 or document datastore 132. Accordingly, the 111111112 (with associated Rev 2) reference citation is not transformed to a hyperlink.

In some examples, when a given reference citation in technical document 111 matches a stored reference citation from a source of truth (e.g., asset datastore 131 or document datastore 132), the technical document review tool 100 may obtain metadata regarding the matching stored reference citation. For example, for a document, the obtained metadata may include a title of the document, an author/owner of the document, a record number for the stored reference citation, a document type (e.g., report, test method, drawing, work instruction, protocol, etc.), a currently approved revision number, and a storage location (e.g., a uniform resource locator (URL)) for the record corresponding to the stored reference citation. For an asset, the obtained metadata may include an asset name, an asset location, an asset status, and a storage location (e.g., a URL) for the record corresponding to the stored reference citation. In some examples, the obtained storage locations (e.g., URL's) may be used, by the technical document review tool 100, to create the hyperlinks 321-326 shown in FIG. 3, such as by having the hyperlinks 321-326 provide links to the obtained storage locations (e.g., URL's).

Figure 4:
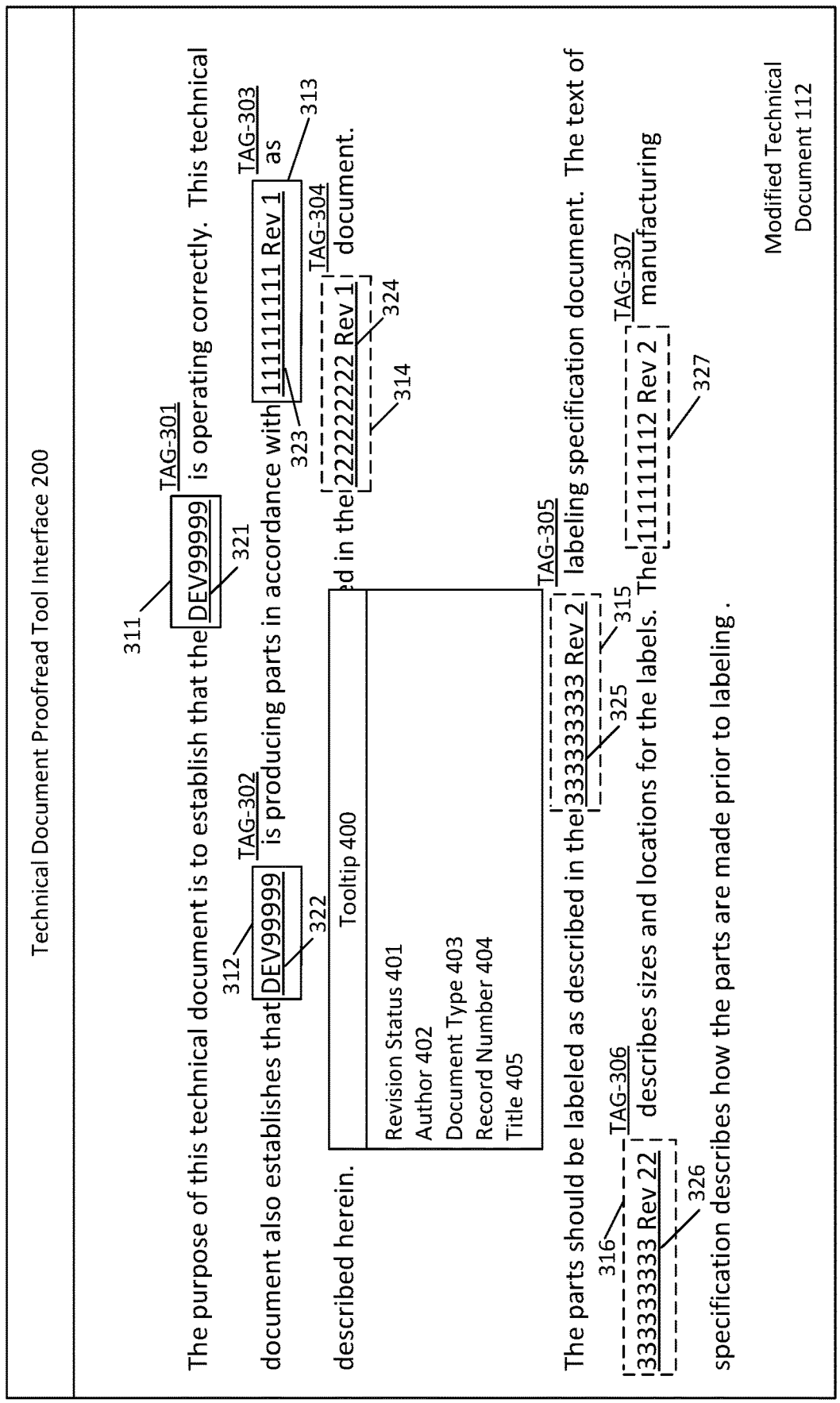
FIG. 4 is a diagram of an example modified technical document with a reference citation tooltip.

Additionally, in some examples, the technical document review tool 100 may display at least part of the metadata obtained from asset datastore 131 or document datastore 132. In one specific example, the metadata may be displayed via a tooltip that temporarily overlays modified technical document 112. For example, in some cases, when a cursor hovers over a location associated with a given reference citation, a tooltip may be temporarily displayed that includes metadata corresponding to the given reference citation. Referring now to FIG. 4, an example tooltip 400 will now be described in detail. In the example of FIG. 4, tooltip 400 corresponds to the reference citation 333333333 (with associated Rev 2). In some examples, tooltip 400 may be displayed when a cursor hovers over a location associated with reference citation 333333333 (with associated Rev 2), such as a location at, or adjacent to, the location of the reference citation in modified technical document 112 (e.g., the location of tag 305). In the example of FIG. 4, tooltip 400 comprises metadata including a revision status 401 (e.g., released, revised, etc.) for the specified revision (i.e., Rev 2), an author 403 of the document, a document type 403 (e.g., report, test method, drawing, work instruction, protocol, etc.), a record number 404 for the stored reference citation, and a title 405 of the document. In some examples, by displaying metadata, the technical document review tool may allow human users to confirm that a citation is made to a correct and intended reference. This may be especially helpful to prevent scenarios in which a typo causes a citation to improperly refer to an unintended reference that just happens to be released. For example, by reviewing a title of a referenced document, a user can confirm that the document is what it is expected it to be.

In addition to modified technical document 112, reference information tables 113 may also be generated by technical document review tool 100 and used to convey information about reference citations. The reference information tables 113 may be displayed via technical document review tool interface 110. In one specific example, the reference information tables 113 may be appended to the end of modified technical document 112. Referring now to FIG. 5, an example of a reference summary table 500 will now be described in detail. Reference summary table 500 may be included in reference information tables 113. In the example of FIG. 5, reference summary table 500 includes a reference type column 501, a reference citation column 502, a description column 503, and a count column 504. Each row of reference summary table 500 corresponds to a respective set of one or more identical reference citations that are detected within technical document 111. Reference type column 501 indicates a type of each reference citation that is detected in the technical document 111, such as whether the reference citation is an asset, a document, a likely error, etc. For example, a given reference citation may be determined to be an asset when it is matched to a stored reference citation in asset datastore 131. By contrast, a given reference citation may be determined to be a document when it is matched to a stored reference citation in document datastore 132. Additionally, a given reference citation may be determined to be a likely error when it is not matched to any stored reference citation in asset datastore 131 or document datastore 132. Reference citation column 502 identifies the respective reference citation for each row of reference summary table 500. Description column 503 includes a description for each respective reference citation. Count column 504 indicates a quantity of times that each respective reference citation appears in the technical document 111. For example, as shown in FIG. 2A, the reference citation 333333333 appears twice in technical document 111 (i.e., on the fourth and fifth lines of text).

In the example of FIG. 5, reference summary table 500 provides a warning when multiple different revisions of the same reference citation are detected in the technical document 111. Specifically, as shown in FIG. 5, multiple different revisions of reference citation 333333333 are detected in technical document 111. In particular, as shown in FIG. 2A, Rev 2 is specified for the reference citation 333333333 on line four, while Rev 22 is specified for the reference citation 333333333 on line four. This is a strong indication that at least one of the specified revision numbers is incorrect. Thus, a warning of the multiple different revisions for 333333333 is displayed in reference summary table 500.

Referring now to FIG. 6, an example of a reference list table 600 will now be described in detail. Reference list table 600 may also be included in reference information tables 113. In the example of FIG. 6, reference summary table 500 includes a reference type column 601, a tag column 602, a surrounding text column 603, a status column 604, and a description column 605 (referred to collectively as columns 601-605). Each row of reference list table 600 corresponds to a respective reference citation that is detected in technical document 111. Description column 605 includes a description for each respective reference citation. Reference type column 601 indicates a type of each reference citation that is detected in the technical document 111, such as whether the reference citation is an asset, a document, a document with an invalid revision, a likely error, etc. For example, a given reference citation may be determined to be an asset when it is matched to a stored reference citation in asset datastore 131. By contrast, a given reference citation may be determined to be a document when it is matched to a stored reference citation in document datastore 132. In this example, for scenarios in which a valid revision is specified for a document, the reference type column 601 may include the word "Document". By contrast, for scenarios in which an invalid revision is specified for a document, the reference type column 601 may include the words "Invalid Revision". Additionally, a given reference citation may be determined to be a likely error when it is not matched to any stored reference citation in asset datastore 131 or document datastore 132.

Tag column 602 includes tags 301-307, which each correspond to a respective reference citation. For example, referring back to FIG. 3, it is shown that technical document review tool 100 inserts tags 301-307 into modified technical document 100. Each tag 301-307 is displayed in modified technical document 112 adjacent to its respective reference citation. For example, tag 303 corresponds to the 111111111 (with associated Rev 1) citation and is displayed adjacent to that citation in modified technical document 112. Tags 301-307 may allow the user to easily navigate between a reference citation's location in the modified technical document 112 of FIG. 3 and a corresponding row of reference list table 600 of FIG. 6. As a specific example, when modified technical document 112 is being displayed in technical document review tool interface 110, a user may select tag 303 within modified technical document 112, such as by clicking on tag 303 using an attached input device (e.g., mouse, touchscreen, etc.). In some examples, when the user selects tag 303 in modified technical document 112, this may cause technical document review tool interface 110 to automatically scroll to, and display, the third row of reference list table 600, which also corresponds to the 111111111 (with associated Rev 1) citation. By contrast, when reference list table 600 is being displayed in technical document review tool interface 110, a user may select tag 303 within reference list table 600, such as by clicking on tag 303 using an attached input device (e.g., mouse, touchscreen, etc.). In some examples, when the user selects tag 303 in reference list table 600, this may cause technical document review tool interface 110 to automatically scroll to, and display, the second line of text in modified technical document 112, which includes the 111111111 (with associated Rev 1) citation. In this manner, tags 303 may allow the user to easily navigate between the 11111111 (with associated Rev 1) citation's locations in the modified technical document 112 of FIG. 3 and reference list table 600 of FIG. 6. In some examples, the use of tags 301-307 may be particularly advantageous with large technical documents that may include large quantities of reference citations. In these large technical documents, without the use of tags 301-307, a user might often be required to scroll and search through several pages of text in order to find a location of a reference citation in the technical document and/or in the accompanying or appended reference information tables 113.

Surrounding text column 603 shows a portion of text from the modified technical document 112 (or technical document 111) that surrounds the reference citation within the modified technical document 112 (or technical document 111). For example, as shown in FIG. 3, the 333333333 (with associated Rev 2) citation is between the words "the" and "labeling" on the fourth line of text. Accordingly, this text is shown in the in the fifth row of surrounding text column 603. Thus, surrounding text column 603 may assist the user, such as by providing some of the context in which a reference is cited, without requiring the user to scroll to the actual location of the citations within the modified technical document 112.

Status column 604 includes reference citation status information, such as document revision status information, unknown citation status information, and the like. Specifically, for each detected document citation, status column 604 may indicate the status of the revision that is specified in technical document 111. If the specified revision is not currently approved or released, status column 604 may also indicate which revision (if any) is currently approved or released. For example, for citation 222222222 (with associated Rev 1), the fourth row of status column 604 indicates that Rev 1 has been revised and that Rev 2 is released. Thus, a revision mismatch is detected because the specified revision (Rev 1) is currently revised. Based at least in part on this revision mismatch, technical document review tool 100 has assigned first-priority review status 201 to this citation (as indicated by dashed-line box 314). Also, for citation 333333333 (with associated Rev 2), the fifth row of status column 604 indicates that Rev 2 has been revised and that Rev 3 is released. Thus, a revision mismatch is detected because the specified revision (Rev 2) is currently revised. Based at least in part on this revision mismatch, technical document review tool 100 has assigned first-priority review status 201 to this citation (as indicated by dashed-line box 315). Also, for citation 333333333 (with associated Rev 22), the sixth row of status column 604 indicates that Rev 22 is not found and that Rev 3 is released. Thus, a revision mismatch is detected because the specified revision (Rev 22) is not found. Based at least in part on this revision mismatch, technical document review tool 100 has assigned first-priority review status 201 to this citation (as indicated by dashed-line box 316).

For each detected reference citation that cannot be matched to a stored reference citation from asset datastore 131 or document datastore 132, status column 604 may indicate that the reference citation is unknown. For example, for citation 111111112 (with associated Rev 1), the sixth row of status column 604 indicates that 111111112 is an unknown nine-digit number (and a possible typo). For example, it is possible that an author of the technical document 111 had intended to type 111111111, but instead typed 111111112, thereby resulting in a typo. Based at least in part on the failure to match 111111112 to any stored reference citation, technical document review tool 100 has assigned first-priority review status 201 to this citation (as indicated by dashed-line box 317). It is further noted that status column 604 includes no information (i.e., is blank) for the top two rows of reference list table 600. This is because the top two rows correspond to citations to DEV99999, which is determined to be an asset and which, therefore, has no associated revision status.

Referring now to FIG. 7, an example of a warning and error table 700 will now be described in detail. Warning and error table 600 may also be included in reference information tables 113. Warning and error table 700 may be used to display information regarding reference citations that have likely errors. In this example, warning and error table 700 includes only reference citations that have first-priority review status 201. Reference citations that have second-priority review status 202 are not included in warning and error table 700. By contrast, reference list table 600 of FIG. 6 includes all references citations, including those that have second-priority review status 202 and first-priority review status 201. For example, the top three rows of reference list table 600 correspond to reference citations that have second-priority review status 202. Accordingly, the top three rows of reference list table 600 are not included in warning and error table 700. By contrast, the bottom four rows of reference list table 600 correspond to reference citations that have first-priority review status 201. Accordingly, the bottom four rows of reference list table 600 are included in warning and error table 700. Accordingly, warning and error table 700 includes only four rows (corresponding to the bottom four rows of reference list table 600). In this manner, warning and error table 700 may allow users to quickly and easily view information regarding reference citations that have likely errors. As shown in FIG. 7, warning and error table 700 includes a reference type column 701, a tag column 702, a surrounding text column 703, a status column 704, and a description column 705 (referred to collectively as columns 701-705). In this example, columns 701-705 of warning and error table 700 are similar to columns 601-605 of reference list table 600. Thus, the above descriptions of columns 601-605 may be considered to also apply to columns 701-705 without being repeated here.

In some examples, the technical document review tool 100 may also identify critical-to-quality features within the technical document 111, such as to flag these features for human review. Critical-to-quality features are features (e.g., characteristics) of a device and/or product (e.g., a medical device) that have a critical impact on the function, efficacy or/and safety of the device and/or product. Critical-to-quality features may include features such as dimensional size, surface roughness, mechanical strength, chemical composition, and the like. Critical-to-quality features may often be identified in controlled documents (e.g., product specifications, drawings etc.) and then referred to in other related technical documents. Because critical-to-quality features are critically important, the technical document review tool 100 may employ pattern recognition to detect and summarize the critical-to-quality features identified within the technical document 111 to aid human review of the critical-to-quality features. In some examples, the critical-to-quality features may be detected by analyzing the technical document to find text including the letters CTQ or other similar English or corresponding non-English language indications of the term critical-to-quality. In some examples, the critical-to-quality features may be indicated, in the modified technical document 112, using a corresponding respective indication, such as being highlighted using a respective color in a color-coding scheme (e.g., a blue color).

Figure 8:
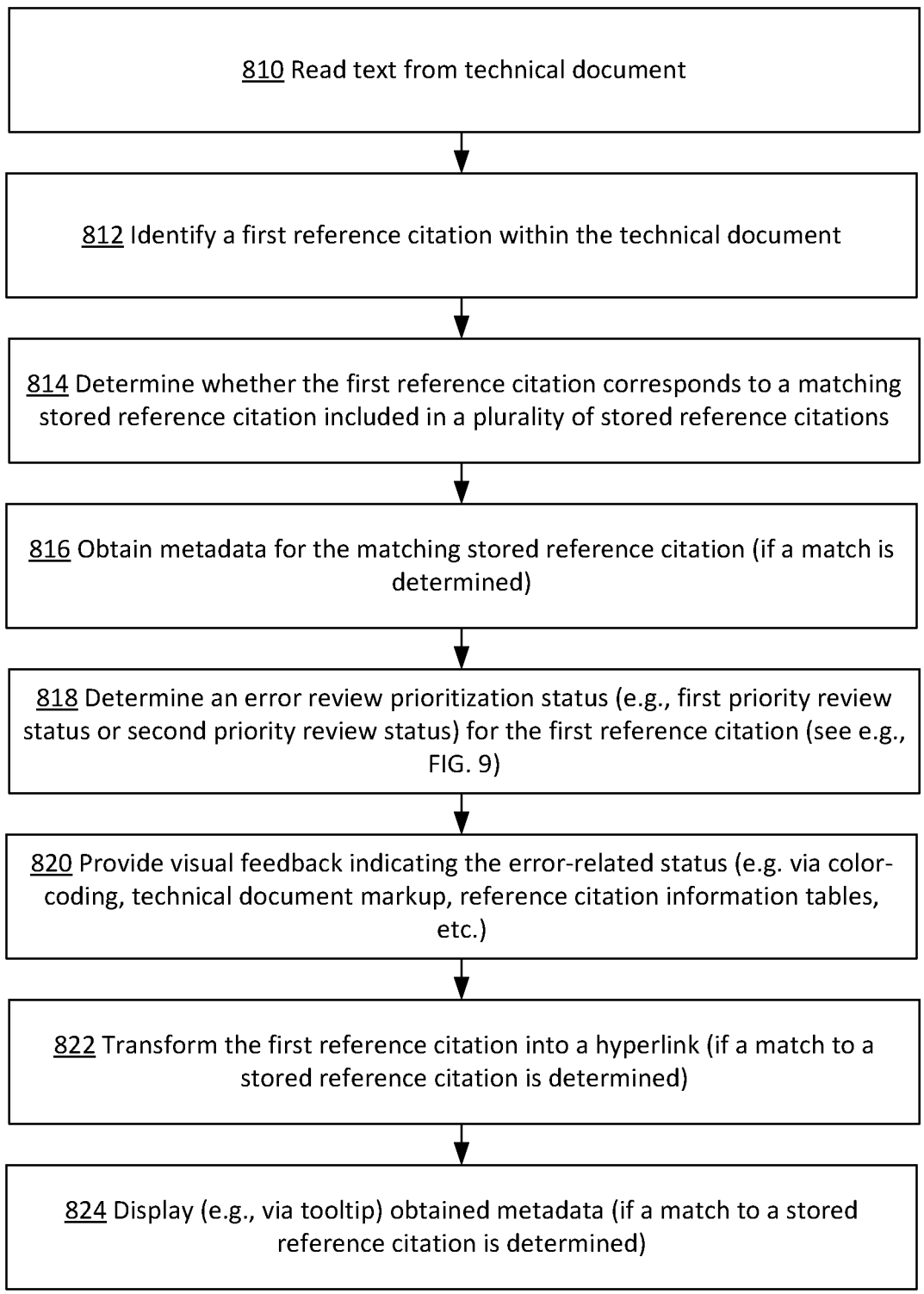
FIG. 8 is a flowchart illustrating an example technical document review process.

FIG. 8 is a flowchart illustrating an example technical document review process. In some examples, any, or all, of the operations of FIG. 8 may be performed by technical document review tool 100 and/or by a computing system 104 that executes technical document review tool 100. The process of FIG. 8 is initiated at operation 810, at which text is read from a technical document. For example, the technical document review tool 100 may read text from the technical document, such as by retrieving the technical document from storage and electronically reading the contents of the technical document. In some examples, the technical document may be a word processing or spreadsheet document and may be stored in one or more electronic files. In some cases, optical character recognition techniques may be employed to read text that is included in images that may optionally be included in the technical document.

At operation 812, a first reference citation is identified within a technical document. The first reference citation may be identified based at least in part a length of a first block of text that is included in the first reference citation and an inclusion of at least one numeric character in the first block of text. For example, the first reference citation may be identified based at least in part on the first block of text including at least a specified minimum number of characters, such as at least three characters. As described above, reference detection rules 121 may specify that a reference is detected when a block of text is identified that has at least the specified minimum number of characters (e.g., three characters) and that has at least one numeric character. The term block of text, as used herein, refers to text having a start and an end that correspond to boundaries (e.g., spaces, tabs, new line returns, start of a string, end of a string, etc.). Thus, for example, a block of text may be text between two spaces, such as a word. Accordingly, when a reference citation is limited to a block of text, the reference citation cannot include a space. The reference citation may, however, include letters, numbers, and/or symbols. In some examples, the technical document review tool may scan the text of the technical document to identify each block of text that is at least three characters long and that has at least one numeric character, and each such identified block of text may be considered to be a reference citation.

At operation 814, it is determined whether the first reference citation matches a matching stored reference citation included in a plurality of stored reference citations. This determination may be made based on querying at least one datastore, and the at least one datastore may include asset datastore 131 and/or document data store 132. For example, as described above, the technical document analysis engine 120 may query sources of truth, such as the asset datastore 131 and/or the document datastore 132, to determine whether an identified reference citation matches any stored reference citation. In some examples, when the identified reference citation does not match any stored reference citation, then this may be an indication of a potential error. Additionally, if a revision number is specified for the reference citation, the technical document analysis engine 120 may also query the document datastore 120 to determine whether the specified revision is currently approved or released. When the specified revision is not currently approved or released, then this may be an indication of a definite error.

At operation 816, if the first reference citation matches a matching stored reference citation, metadata is obtained for the matching stored reference citation. The metadata may be obtained from the at least one datastore (e.g., asset datastore 131 or document datastore 132). As described above, when a given reference citation in technical document 111 matches a stored reference citation from a source of truth (e.g., asset datastore 131 or document datastore 132), the technical document review tool 100 may obtain metadata regarding the matching stored reference citation. For example, for a document, the obtained metadata may include a title of the document, an author/owner of the document, a record number for the stored reference citation, a document type (e.g., report, test method, drawing, work instruction, protocol, etc.), a currently approved revision number, and a storage location (e.g., a uniform resource locator (URL)) for the record corresponding to the stored reference citation. For an asset, the obtained metadata may include an asset name, an asset location, an asset status, and a storage location (e.g., a URL) for the record corresponding to the stored reference citation.

At operation 818, an error review prioritization status for the first reference citation is determined. As described above, the error review prioritization status may be determined, based at least in part, on whether the first reference citation matches the matching stored reference citation. As also described above, the error review prioritization status may also be determined based, in part, on whether a revision number for the first reference citation is specified in the technical document. If a revision number is specified, the error review prioritization status may also be determined based, in part, on the revision number for the first reference citation is specified in the technical document. In some examples, such as described above with reference to FIG. 2B, the error review prioritization status may be either a second-priority review status 202 or a first-priority review status 201. As described above, the second-priority review status 202 may correspond to a successful matching of the first reference citation to the matching stored reference citation and no revision error. In this context, no revision error means that, if the first reference citation is a document, a specified revision (if any) is approved or released. As also described above, there are a number of scenarios when the first-priority review status 201 may be assigned to the first reference citation. Specifically, the first-priority review status 201 may correspond to a failure to match the first reference citation to the matching stored reference citation (e.g., the first reference citation doesn't match any stored reference citation in asset datastore 131 or document datastore 132). The first-priority review status 201 may also correspond to a successful matching of the first reference citation to the matching stored reference citation and a revision error. For example, the first-priority review status 201 may also be assigned in cases when the first reference citation matches a stored reference citation, but the specified revision isn't currently approved or released. The first-priority review status 201 may also be assigned in cases when the first reference citation matches a stored reference citation, no revision is specified, and no revision is currently approved or released. The first-priority review status 201 may also be assigned in cases when there are multiple different revisions of the first reference citation that are specified in the technical document 111. When multiple different revisions of an identified reference citation that are specified in the technical document 111, this is an indication that at least one of the identified revisions is likely to be an error. Some example techniques for performing operation 818 may be described in greater detail below with reference to FIG. 9.

At operation 820, visual feedback indicating the error review prioritization status is provided. In some examples, the visual feedback may include a visual modification to the technical document, such as highlighting the first reference citation with a given color. Other visual indications, such shapes, lines (e.g., solid, dashed, etc.), patterns, text effects (e.g., underlining, bold, italics), and the like may additionally or alternatively be employed. Additionally, in some examples, the visual feedback may have a color-coding that indicates the error review prioritization status of the first reference citation. In one specific example, green color-coding (e.g., green highlighting) may be used to indicate the second-priority review state, while red color-coding (e.g., red highlighting) may be used to indicate the first-priority review state. Furthermore, in some examples, the visual feedback may be at least partially included in a reference information table. For example, as described above with in relation to FIGS. 5-7, reference information tables 113, which may optionally include reference summary table 500, reference list table 600, and warning and error table 700, may be employed to provide visual feedback indicating the error review prioritization status. As a specific example, surrounding text column 603 of reference list table 600 includes solid-lined boxes 311-313, which indicate the second-priority review status for corresponding reference citations, and dashed-lined boxed 314-317, which indicate the first-priority review status for corresponding reference citations. As also described above, the reference information table may include a clickable link to a location, within the technical document, of the first reference citation. For example, tag column 602 of reference list table 600 includes tags 301-307, which link to respective locations, in modified technical document 112, of the corresponding reference citations.

At operation 822, if the first reference citation matches a matching stored reference citation, the first reference citation is transformed into a hyperlink. The hyperlink may link to a record of the matching stored reference citation, such as a record in asset datastore 131 or document datastore 132. This may allow a user to quickly and easily navigate to the linked record and confirm whether the first reference citation is correct. In the example of FIG. 3, the first DEV99999 reference citation on the first (i.e., top) line of modified technical document 112 is determined to match to a stored reference citation in asset datastore 131. Accordingly, the first DEV99999 reference citation is transformed to a hyperlink 321 that links to the record for the stored reference citation in asset datastore 131. As described above, the metadata for the matching stored reference citation obtained at operation 816 may include a URL for the record of the matching stored reference citation in asset datastore 131 or document datastore 132. In some examples, the obtained URL may be used, by the technical document review tool 100, to create the hyperlink at operation 822.

At operation 824, if the first reference citation matches a matching stored reference citation, then the obtained metadata (i.e., the metadata for the matching stored reference citation) is displayed. In some examples, the metadata may be displayed in a tooltip. For example, as shown in FIG. 4, tooltip 400 corresponds to the reference citation 333333333 (with associated Rev 2). In the example of FIG. 4, tooltip 400 comprises metadata including a revision status 401 (e.g., released, revised, etc.) for the specified revision (i.e., Rev 2), an author 403 of the document, a document type 403 (e.g., report, test method, drawing, work instruction, protocol, etc.), a record number 404 for the stored reference citation, and a title 405 of the document.

Figure 9:
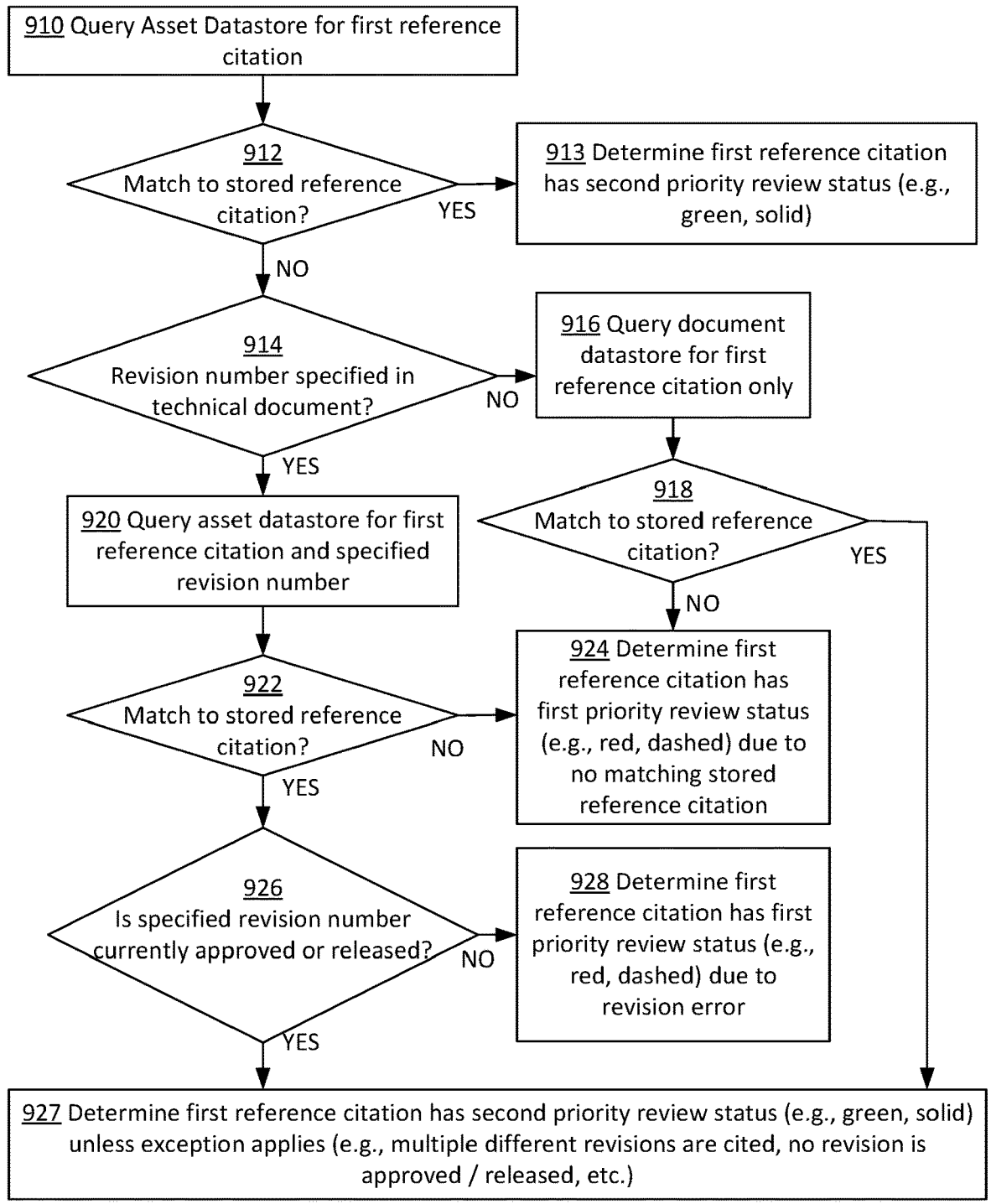
FIG. 9 is a flowchart illustrating an example error-associated status determination process.

FIG. 9 is a flowchart illustrating an example error-associated status determination process. In some examples, any, or all, of the operations of FIG. 9 may be performed by technical document review tool 100 and/or by a computing system 104 that executes technical document review tool 100. In some examples, operations 814 and 818 of FIG. 8 may be performed using the process of FIG. 9. The process of FIG. 9 is initiated at operation 910, at which an asset datastore is queried for the first reference citation. Specifically, operation 910 may include querying the asset datastore to determine whether the first reference citation matches a matching stored reference citation that is stored in the asset datastore (which may be also be performed as part of operation 814 of FIG. 8).

At operation 912, it is determined (i.e., based on the querying of operation 910) whether the first reference citation matches a matching stored reference citation that is stored in the asset datastore. If the first reference citation matches a matching stored reference citation that is stored in the asset datastore, then, at operation 913, it is determined that the first reference citation has second-priority review status. For example, for the DEV99999 reference citation on the top line of technical document 111 of FIG. 2A, the technical document review tool 100 may query asset datastore 131 and determine that the DEV99999 reference citation matches a reference citation that is stored in the asset datastore 131. Based on this determination, the technical document review tool 100 may assign the second-priority review status to the DEV99999 reference citation. This is indicated, for example, by the solid-lined box 311 surrounding the DEV99999 reference citation on the top line of modified technical document 112 of FIG. 3. As described above, the second-priority review status may also be indicated in other ways, such as via green highlighting, etc.

If the first reference citation doesn't match any stored reference citation that is stored in the asset datastore, then, at operation 914, it is determined whether a revision number for the first reference citation is specified in the technical document. The error review prioritization status may also be determined based, in part, on whether a revision number for the first reference citation is specified in the technical document. If a revision number is specified, the error review prioritization status may also be determined based, in part, on the revision number for the first reference citation is specified in the technical document. As described above, the technical document analysis engine 120 may apply revision detection rules 122 to determine whether a reference number for the reference citation is specified in the technical document 111. In one specific example, the revision number is determined to be specified based at last in part on the first reference citation being immediately followed by a word boundary that is immediately followed by the English word Revision or an English abbreviation thereof (e.g., Rev, R, etc.) or a corresponding non-English language word or non-English language abbreviation. Additionally, in some examples, a revision number may be detected when the word Revision (or abbreviation thereof or corresponding non-English word/abbreviation) is followed (i.e., immediately followed or separated by a word boundary) by a string of text having a minimum length of one character and a specified maximum length of characters (e.g., five characters).

If no revision number for the first reference citation is specified in the technical document, then, at operation 916, the document datastore is queried for the first reference citation only (i.e., with no revision number). Specifically, operation 916 may include querying the document datastore to determine whether the first reference citation matches a matching stored reference citation that is stored in the document datastore (which may be also be performed as part of operation 814 of FIG. 8). At operation 918, it is determined (i.e., based on the querying of operation 916) whether the first reference citation matches a matching stored reference citation that is stored in the document datastore. If the first reference citation doesn't match any stored reference citation that is stored in the document datastore, then, at operation 924, it is determined that the first reference citation has first-priority review status due to no matching stored reference citation. As described above, the first-priority review status may be indicated, for example, via red highlighting, dashed-lined boxes, etc.

If, at operation 918, it is determined that the first reference citation does match a matching stored reference citation that is stored in the document datastore, then, at operation 927, it is determined that the first reference citation has second-priority review status (unless an exception applies). In this context, an exception may apply, for example, when no revision of the matching stored reference citation is currently approved or released (thereby indicating a potential error and causing the first-priority review status to be assigned instead to the first reference citation). By contrast, if an exception does not apply, then it is determined, at operation 927, that the first reference citation has second-priority review status.

If, at operation 914, it is determined that a revision number for the first reference citation is specified in the technical document, then, at operation 920, the document datastore is queried for the first reference citation (e.g., as part of operation 814 of FIG. 8) and the specified revision number. At operation 922, it is determined (i.e., based on the querying of operation 920) whether the first reference citation matches a matching stored reference citation that is stored in the document datastore. If the first reference citation doesn't match any stored reference citation that is stored in the document datastore, then, at operation 924, it is determined that the first reference citation has first-priority review status due to no matching stored reference citation. For example, for the 111111112 (with associated Rev 1) reference citation on the fifth line of technical document 111 of FIG. 2A, the technical document review tool 100 may query document datastore 132 and determine that the 111111112 reference citation doesn't match any reference citation that is stored in the document datastore 132. Based on this determination, the technical document review tool 100 may assign the first-priority review status to the 111111112 reference citation. This is indicated, for example, by the dashed-lined box 317 surrounding the 111111112 reference citation on the fifth line of modified technical document 112 of FIG. 3. As described above, the first-priority review status may also be indicated in other ways, such as via red highlighting, etc.

If, at operation 922, it is determined that the first reference citation does match a matching stored reference citation that is stored in the document datastore, then, at operation 926, it is determined whether the specified revision number is currently approved or released. If the specified revision number isn't currently approved or released, then, at operation 928, it is determined that the first reference citation has first-priority review status due to a revision error. For example, for the 222222222 (with associated Rev 1) reference citation on the third line of technical document 111 of FIG. 2A, the technical document review tool 100 may query document datastore 132 and determine that the 222222222 reference citation matches a matching stored reference citation that is stored in the document datastore 132. Additionally, the technical document review tool 100 may then determine that the specified revision number (Rev 1) is not currently approved or released (i.e., because Rev 1 is revised and Rev 2 is released). Based on these determinations, the technical document review tool 100 may assign the first-priority review status to the 222222222 (with associated Rev 1) reference citation. This is indicated, for example, by the dashed-lined box 314 surrounding the 222222222 (with associated Rev 1) reference citation on the third line of modified technical document 112 of FIG. 3. As described above, the first-priority review status may also be indicated in other ways, such as via red highlighting, etc.

If, at operation 926, it is determined that the specified revision number is currently approved or released, then, at operation 927, it is determined that the first reference citation has second-priority review status (unless an exception applies). In this context, an exception may apply when multiple different revisions of the first reference citation are used in the technical document (thereby indicating a potential error and causing the first-priority review status to be assigned instead to the first reference citation). By contrast, if an exception does not apply, then it is determined, at operation 927, that the first reference citation has second-priority review status. For example, for the 111111111 (with associated Rev 1) reference citation on the second line of technical document 111 of FIG. 2A, the technical document review tool 100 may query document datastore 132 and determine that the 111111111 reference citation matches a matching stored reference citation that is stored in the document datastore 132. Additionally, the technical document review tool 100 may then determine that the specified revision number (Rev 1) is released. Furthermore, the technical document review tool may also confirm that no exception applies (e.g., that multiple different revision numbers aren't used for 111111111 in technical document 111). Based on these determinations, the technical document review tool 100 may assign the second-priority review status to the 111111111 (with associated Rev 1) reference citation. This is indicated, for example, by the solid-lined box 313 surrounding the 111111111 (with associated Rev 1) reference citation on the second line of modified technical document 112 of FIG. 3. As described above, the second-priority review-attention status may also be indicated in other ways, such as via green highlighting, etc.

Thus, the techniques described above provide clear improvements in the functioning of a computer and/or improvements in other technical fields, such as computer-based review and proofreading of electronic technical documents. Specifically, while computers may be employed to provide certain proofreading tasks, such as spell-checking and grammatical proofreading, the techniques described herein allow computer-based assistance for other review tasks, such as the review of technical document reference citations.

It is noted that, as described above, the automated review tasks that are performed by the technical document review tool 100 differ from those performed by human reviewers. Specifically, a human reviewer is responsible for final determinations regarding whether a reference citation is correct or incorrect. By contrast, the technical document review tool 100 is not employed to make these types of final determinations. Rather, the technical document review tool 100 instead serves as an aide to assist the human reviewer, such as by prioritizing the human review of certain reference citations (e.g., citations with first-priority review status) relative to other reference citations (e.g., citations with second-priority review status). Specifically, the technical document review tool may provide an error review prioritization status for identified reference citations, for example by indicating whether reference citations have first-priority review status 201 or second-priority review status 202. This may aide the human review process, such as by allowing humans to devote greater amounts of time and attention to reference citations with first-priority review status 201. Furthermore, the technical document review tool 100 may display metadata, which may help human users to quickly review citations with second-priority review status 202, such as by allowing the user to confirm via the reference title that the reference is what was intended by the author and makes sense within in the context of the technical document 111. Additionally, it is noted that a set of rules (e.g., review prioritization rules 123 of FIG. 1) is provided, and described in detail above, for determining an error review prioritization status for a reference citation. For at least these reasons, it is submitted that the technical document review tool 100 is not merely automating or applying tasks that have traditionally been performed by humans. Rather, the technical document review tool is instead performing a different set of review tasks (e.g., prioritization tasks) that serve as an aide to improve the reliability and efficiency of the human review process.

As also described above, a set of reference detection rules 121 may be employed by a technical document review tool 100 to detect reference citations within a technical document 111. These rules may include detecting of reference citations based on a length or a block of text and a determination that the block of text includes at least one numeric character. In one example, these rules may include determining that each block of text that includes at least a specified minimum number of characters (e.g., at least three characters) and at least one numeric character is a detected reference citation. It is noted that the reference detection rules 121 employed by the technical document review tool 100 at least partially differ from techniques that may be employed by humans to detect reference citations in a technical document. In particular, consider how a human user may evaluate a typical English word in a technical document, such as the word "example." Specifically, it is submitted that, upon seeing the word "example" in a technical document, it would be immediately apparent to a human user that the word "example" is not a reference citation. The human would have no need to count the characters in the word "example" in order to determine that it is not a reference citation. Also, the human would have no need to look at individual characters in the word "example" to determine whether any of those individual characters is a numeric character. Rather, the human would immediately recognize the word "example" as an English word and not a reference citation.

The techniques described herein further include a number of transformations to the technical document 111 in order to aide the human user. For example, as described above, reference citations within the technical document 111 may be transformed using an associated visual indicator to indicate their corresponding error review prioritization status. As described above, in some examples, reference citations with first-priority review status 201 may be assigned red highlighting, while reference citations with second-priority review status 202 may be assigned green highlighting. Furthermore, reference citations that match a stored reference citation from a source of truth (e.g., an asset datastore 131 or document datastore 132) may be transformed into hyperlinks that link to corresponding records from the respective source of truth, thereby allowing navigation to those records and providing a visual confirmation of the match. Additionally, tags may be added to the technical document, and to reference information tables 113, to allow users to navigate between locations of reference citations in the modified technical document 112 and corresponding information in the reference information tables 113. Also, tooltips and other information fields may be added to the modified technical document 112 to display metadata regarding respective reference citations.

EXAMPLE COMPUTING SYSTEM

Figure 10:
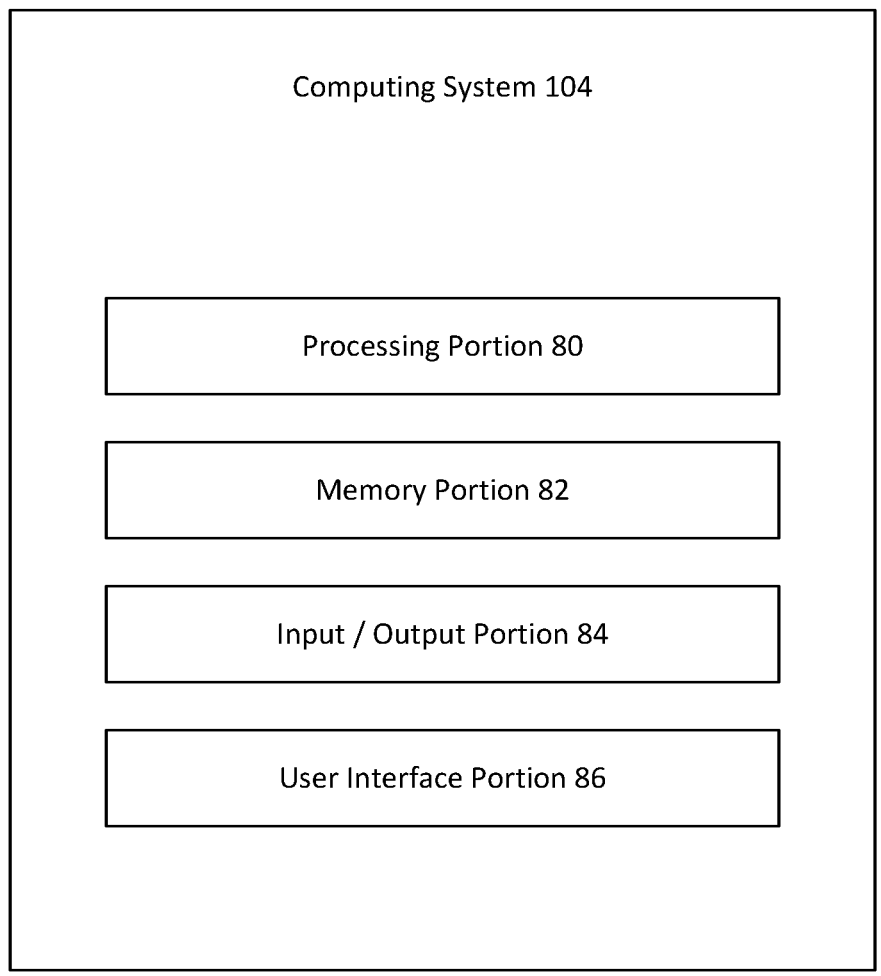
FIG. 10 is diagram of an example computing device that may be employed to perform technical document review operations described herein.

A computing system, as that term is used herein, refers to a system including at least processing components and memory components that is programmable to perform computing operations. A computing system may include, for example, one or more server computers, one or more client computers, one or more desktop computers, one or more portable computers, one or more tablets, one or more smart phones, processing, memory and other components implemented using integrated circuits, microchips, and any combination of these or other computing components and/or computing devices. In addition to processing and memory components, a computing system may optionally include other types of components, such as input/output components and user interface components. Referring to FIG. 10, an example embodiment of computing system 104 will now be described in detail.

In an example configuration, the computing system 104 includes a processing portion 80, a memory portion 82, an input/output portion 84, and a user interface (UI) portion 86. It is emphasized that the block diagram depiction of the computing system 104 is exemplary and not intended to imply a specific implementation and/or configuration. The processing portion 80, memory portion 82, input/output portion 84, and user interface portion 86 can be coupled together to allow communications therebetween. As should be appreciated, any of the above components may be distributed across one or more separate devices and/or locations.

In various embodiments, the input/output portion 84 includes a receiver of the computing system 104, a transmitter of the computing system 104, or a combination thereof. The input/output portion 84 is capable of receiving and/or providing information pertaining to communicating over a network such as, for example, a local area network (LAN) or a wide area network (e.g., the Internet). As should be appreciated, transmit and receive functionality may also be provided by one or more devices external to the computing system 104.

The processing portion 80 may include one or more processors. Depending upon the exact configuration and type of processor, the memory portion 82 can be volatile (such as some types of RAM), non-volatile (such as ROM, flash memory, etc.), or a combination thereof. The computing system 104 can include additional storage (e.g., removable storage and/or non-removable storage) including, but not limited to, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the computing system 104.

The computing system 104 also can contain the user interface portion 86 allowing a user to communicate with the computing system 104. The user interface 86 can include inputs that provide the ability to control the computing system 104, via, for example, buttons, soft keys, a mouse, voice actuated controls, a touch screen, movement of the computing system 104, visual cues (e.g., moving a hand in front of a camera on the computing system 104), or the like. The user interface portion 86 can provide outputs, including visual information (e.g., via a display), audio information (e.g., via speaker), mechanically (e.g., via a vibrating mechanism), or a combination thereof. In various configurations, the user interface portion 86 can include a display, one or more graphical user interfaces, a touch screen, a keyboard, a mouse, an accelerometer, a motion detector, a speaker, a microphone, a camera, a tilt sensor, or any combination thereof. Thus, in one embodiment, a computing system can include a processor, a display coupled to the processor, and a memory in communication with the processor, one or more graphical user interfaces, and various other components. The memory can have stored therein instructions that, upon execution by the processor, cause the computing system to perform operations, such as the operations described above, including those operations shown in FIGS. 8 and 9.

While example embodiments of devices for executing the disclosed techniques are described herein, the underlying concepts can be applied to any system capable of performing the techniques described herein. The various techniques described herein can be implemented in connection with hardware or software or, where appropriate, with a combination of both. Thus, the methods and apparatuses described herein can be implemented, or certain aspects or portions thereof, can take the form of program code (i.e., instructions) embodied in tangible non-transitory storage media, such as floppy diskettes, CD-ROMs, hard drives, or any other processor-readable or machine-readable storage medium (computer-readable storage medium), wherein, when the program code is loaded into and executed by a machine, such as a computer, the machine becomes an apparatus for performing the techniques described herein. In the case of program code execution on programmable computers, the computing system will generally include a processor, a storage medium readable by the processor (including volatile and non-volatile memory and/or storage elements), and may include at least one input device, and at least one output device, for instance a display. The display can be configured to display visual information. The program(s) can be implemented in assembly or machine language, if desired. The language can be a compiled or interpreted language and combined with hardware implementations.

The techniques described herein also can be practiced via communications embodied in the form of program code that is transmitted over some transmission medium, such as over electrical wiring or cabling, through fiber optics, or via any other form of transmission. When implemented on a general-purpose processor, the program code combines with the processor to provide a unique apparatus that operates to invoke the functionality described herein. Additionally, any storage techniques used in connection with the techniques described herein can invariably be a combination of hardware and software.

While the techniques described herein can be implemented and have been described in connection with the various embodiments of the various figures, it is to be understood that other similar embodiments can be used or modifications and additions can be made to the described embodiments without deviating therefrom. For example, it should be appreciated that the steps disclosed above can be performed in the order set forth above, or in any other order as desired. Further, one skilled in the art will recognize that the techniques described in the present application may apply to any environment, whether wired or wireless, and may be applied to any number of such devices connected via a communications network and interacting across the network. Therefore, the techniques described herein should not be limited to any single embodiment, but rather should be construed in breadth and scope in accordance with the appended claims.

What is claimed is:

1. A computer-implemented method comprising:
   identifying, by a computing system, a first reference citation within a technical document, wherein the first reference citation is identified based at least in part a length of a first block of text that is included in the first reference citation and an inclusion of at least one numeric character in the first block of text;
   determining, by the computing system, based on querying at least one datastore, whether the first reference citation matches a matching stored reference citation included in a plurality of stored reference citations;

determining, by the computing system, based at least in part on whether the first reference citation matches the matching stored reference citation, an error review prioritization status for the first reference citation;

providing, by the computing system, visual feedback indicating the error review prioritization status, wherein the visual feedback indicating the error review prioritization status is at least partially included in a reference information table appended to a modified document that includes modifications to the technical document; and transforming the first reference citation to a hyperlink that links to a record of the matching stored reference citation.

2. The computer-implemented method of claim 1, wherein the first reference citation is identified based at least in part on the first block of text including at least a specified minimum number of characters.

3. The computer-implemented method of claim 1, further comprising determining whether a revision number for the first reference citation is specified in the technical document.

4. The computer-implemented method of claim 3, wherein the revision number is determined to be specified based at last in part on the first reference citation being immediately followed by a word boundary that is immediately followed by the English word Revision or an English abbreviation thereof or a corresponding non-English language word or non-English language abbreviation.

5. The computer-implemented method of claim 1, wherein the error review prioritization status comprises a first-priority review status and a second-priority review status.

6. The computer-implemented method of claim 5, wherein the second-priority review status corresponds to a successful matching of the first reference citation to the matching stored reference citation and no revision error.

7. The computer-implemented method of claim 5, wherein the first-priority review status corresponds to a failure to match the first reference citation to the matching stored reference citation.

8. The computer-implemented method of claim 5, wherein the first-priority review status corresponds to a successful matching of the first reference citation to the matching stored reference citation and a revision error.

9. The computer-implemented method of claim 1, wherein the visual feedback has a color coding that indicates the error review prioritization status of the first reference citation.

10. The computer-implemented method of claim 1, wherein the reference information table includes an additional link to a location, within the technical document, of the first reference citation.

11. The computer-implemented method of claim 1, further comprising obtaining, from the at least one datastore, metadata for the matching stored reference citation.

12. The computer-implemented method of claim 11, further comprising displaying the metadata for the matching stored reference citation.

13. The computer-implemented method of claim 1, wherein the at least one datastore comprises at least one of an asset datastore or a document datastore.

14. A computing system comprising:
one or more processors; and
one or more memories having stored therein instructions that, upon execution by the one or more processors, cause the computing system to perform operations comprising:
identifying a first reference citation within a technical document, wherein the first reference citation is identified based at least in part a length of a first block of text that is included in the first reference citation and an inclusion of at least one numeric character in the first block of text;
determining based on querying at least one datastore, whether the first reference citation matches a matching stored reference citation included in a plurality of stored reference citations;
determining based at least in part on whether the first reference citation matches the matching stored reference citation, an error review prioritization status for the first reference citation;
providing visual feedback indicating the error review prioritization status, wherein the visual feedback indicating the error review prioritization status is at least partially included in a reference information table appended to a modified document that includes modifications to the technical document; and
transforming the first reference citation to a hyperlink that links to a record of the matching stored reference citation.

15. The computing system of claim 14, wherein the first reference citation is identified based at least in part on the first block of text including at least a specified minimum number of characters.

16. The computing system of claim 14, wherein the operations further comprise determining whether a revision number for the first reference citation is specified in the technical document.

17. The computing system of claim 16, wherein the revision number is determined to be specified based at last in part on the first reference citation being immediately followed by a word boundary that is immediately followed by the English word Revision or an English abbreviation thereof or a corresponding non-English language word or non-English language abbreviation.

18. The computing system of claim 14, wherein the error review prioritization status comprises a first-priority review status and a second-priority review status.

19. The computing system of claim 14, wherein the visual feedback has a color coding that indicates the error review prioritization status of the first reference citation.

20. The computing system of claim 14, wherein the at least one datastore comprises at least one of an asset datastore or a document datastore.

* * * * *